Oct. 7, 1930.  W. H. RODERICK  1,777,895
UNIVERSAL JOINT FOR MOTOR DRIVEN VEHICLES

Filed Dec. 14, 1926

INVENTOR.
William H. Roderick
BY
U. G. Charles
ATTORNEY.

Patented Oct. 7, 1930

1,777,895

UNITED STATES PATENT OFFICE

WILLIAM H. RODERICK, OF BERRYTON, KANSAS

A UNIVERSAL JOINT FOR MOTOR-DRIVEN VEHICLES

Application filed December 14, 1926. Serial No. 154,728.

My invention relates to a universal joint for a front wheel drive for use on motor driven vehicles.

The object of my invention is to drive the vehicle by its front wheels.

A further object of my invention is to provide a universal joint for the drive wheel that is completely housed and noiseless.

A still further object of my invention is to provide a plurality of flexible discs and metal spiders as connection means between a driving and a driven shaft.

These and other objects will hereinafter be more fully explained, reference being had to the accompanying drawing forming part of this specification and in which like characters apply to like parts in the different views.

Referring to the drawings.

Figure 1:
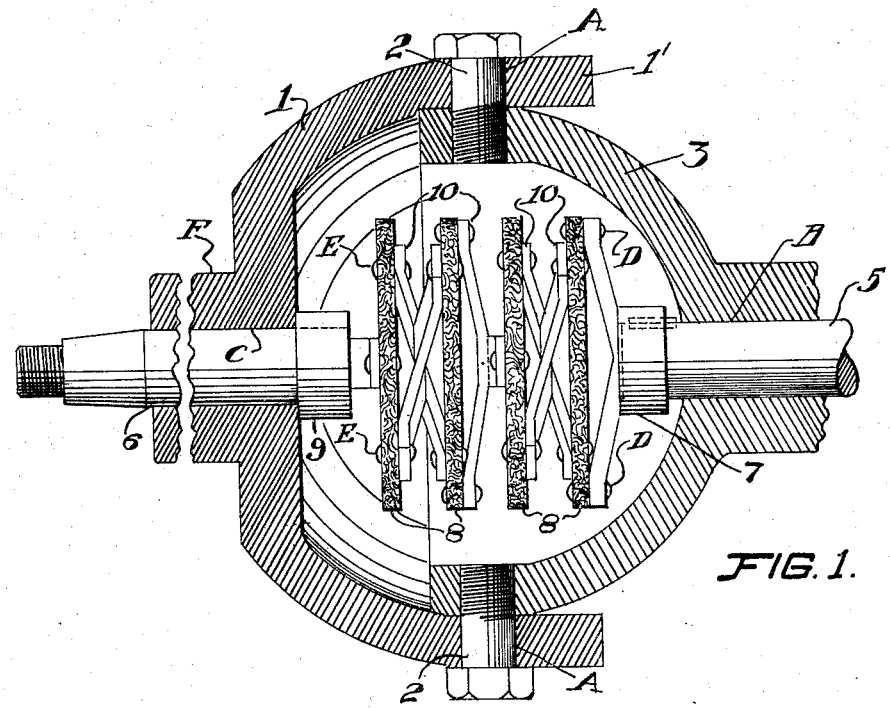
Fig. 1 is a longitudinal sectional view of the universal joint with the discs and spiders and their component parts in elevation.

A hemispherical housing 1 is trunnioned by the knuckle bolts 2 to a second hemispherical housing 3, the latter being integral with a drive shaft housing 4. A drive shaft 5 extends in the interior of the housing 3 as indicated at B and a driven shaft 6 is trunnioned as indicated at C in the hemispherical housing 1. A spider member 7 is rigidly positioned on the end of the drive shaft 5 and is affixed to an adjacent one of the flexible discs 8 in the manner indicated at D. In a similar manner the spider 9 is positioned on the end of the shaft 6 and affixed to one of the flexible discs 6 as indicated at E.

In the instance shown there are four flexible discs 8. These discs are connected to each other by the spiders 10, the latter being affixed to the flexible discs 8 in a manner similar to the fastening of the spiders 7 and 9.

A steering arm 1' is made integral with the hemispherical portion 1 and the fragmentary portion of a tie rod 1" is shown to indicate the steering connection with the left wheel. The wheel pivots at the knuckle bolts 2 and the driving torque is transmitted from the shaft 5 through the assembly of spiders and flexible discs to the shaft 6. The shaft 6 is arranged to be rigidly connected to the wheel 6', the rotation of the latter being carried on the housing 1 at F.

Figure 3:
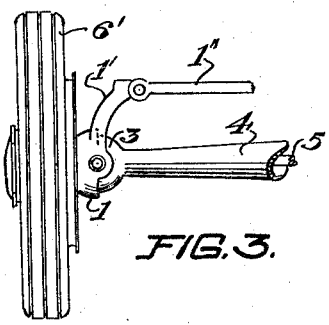
Fig. 3 is a fragmentary plan view of a right front wheel and a portion of the axle housing showing the universal joint in position.

The universal joint herein described is positioned on an axle housing as indicated in Fig. 3. The hemispherical housing designated by 1 is borne by the wheel 6' which is made rotatable with the shaft 6 trunnioned as shown. The hemispherical housing 1 is pivotally mounted on the hemispherical housing 3 by reason of the knuckle bolts 2 and has an extension arm 1' to which is connected a tie rod 1" and through which the movement of a steering wheel, not shown, is imparted to the wheel 6'.

The hemispherical housing 3 which is integral with the drive shaft housing is arranged to rock within the portion 1 when the wheel swings on the knuckle bolts 2, thus comprising a spherical housing, one portion of which pivots with the wheel 6' and the other portion of which is stationary with an axle housing. The spherical housing contains the flexible connection comprising the plurality of discs and spiders as herein described. It should be noted that the spider member 7 forms a bifurcated connection between the drive shaft 5 and the adjacent flexible disc 8.

And in a similar manner the spider 9 forms a bifurcated connection between the drive shaft 6 and an adjacent disc 8.

Figure 2:
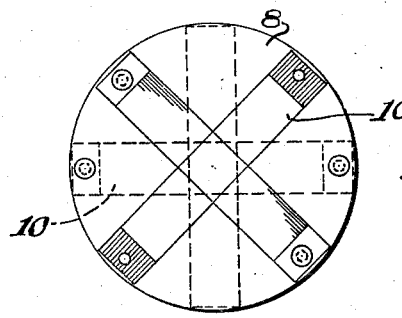
Fig. 2 is an elevation of one of the flexible discs illustrating the position of the spiders thereon.

The plurality of flexible discs 8 are connected by the spiders 10 as shown. These spiders have four arms transversely positioned to each other, two of the aligned arms being connected to one of the discs and the other two arms being connected to the adjacent disc. As the spider connections to the discs are positioned as indicated in Fig. 2, the discs are allowed to flex as they rotate when the axis of the shaft 6 is at an angle to the axis of the shaft 5.

This arrangement constitutes a universal joint that is both sturdy in construction and silent in its operation.

What I claim as new and desire to secure by Letters Patent is:

In a motor driven vehicle, in combination with a driven steering wheel of a motor driven vehicle, a universal joint comprising a plurality of flexible discs and a plurality of spiders, each spider having four arms transversely positioned to each other, two of the aligned arms being connected to one of the discs, the other two being connected to an adjacent disc, by which means the plurality of discs are connected, and are flexed when rocked in any direction, the drive shaft having the outer end bifurcated, the outer end portions of the bifurcation connected to the outer disc member intermediate the connecting points of the spider arms as rotating means for the discs, the opposite outside disc member being connected to the spindle of a wheel as rotating means therefor when the spindle is in axial alignment with the drive shaft or rocked to either side, the universal joint being inclosed by a divided and pivotally connected spherical housing, one portion of which is adapted to rock with the steering wheel, all substantially as shown.

WILLIAM H. RODERICK.